(12) United States Patent
Lei et al.

(10) Patent No.: US 9,954,409 B2
(45) Date of Patent: Apr. 24, 2018

(54) POWER SUPPLY DEVICE

(71) Applicant: FORD GLOBAL TECHNOLOGIES, LLC, Dearborn, MI (US)

(72) Inventors: Guangyin Lei, Dearborn Heights, MI (US); Chingchi Chen, Ann Arbor, MI (US); Michael W. Degner, Novi, MI (US); Edward Chan-Jiun Jih, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 14/810,049

(22) Filed: Jul. 27, 2015

(65) Prior Publication Data

US 2017/0033638 A1 Feb. 2, 2017

(51) Int. Cl.
| | |
|---|---|
| *H02K 9/00* | (2006.01) |
| *H05K 7/20* | (2006.01) |
| *H05K 1/02* | (2006.01) |
| *H02K 5/08* | (2006.01) |
| *H02K 11/33* | (2016.01) |
| *H02K 11/00* | (2016.01) |
| *H02M 1/14* | (2006.01) |
| *H02M 7/00* | (2006.01) |
| *H01G 2/08* | (2006.01) |

(52) U.S. Cl.
CPC ............... *H02K 5/08* (2013.01); *H02K 9/005* (2013.01); *H02K 11/0094* (2013.01); *H02K 11/33* (2016.01); *H02M 1/14* (2013.01); *H02M 7/003* (2013.01); *H01G 2/08* (2013.01); *Y02T 10/7022* (2013.01)

(58) Field of Classification Search
CPC .............. H02K 9/00; H02K 5/02; H01L 23/04
USPC .............................. 310/52, 53; 361/689, 704
See application file for complete search history.

(56) References Cited

U.S. PATENT DOCUMENTS

| | | | |
|---|---|---|---|
| 2008/0316710 A1* | 12/2008 | Seto ...................... | H02M 7/003 361/704 |
| 2010/0047681 A1 | 2/2010 | Mitsui | |
| 2014/0202781 A1* | 7/2014 | Soma ....................... | H02K 3/50 180/65.1 |
| 2014/0334105 A1 | 11/2014 | Chen et al. | |
| 2015/0037662 A1 | 2/2015 | Pinon et al. | |
| 2015/0049533 A1* | 2/2015 | Nishikimi ............. | H02M 7/003 363/141 |
| 2016/0307822 A1* | 10/2016 | Usui ..................... | H01L 23/053 |

FOREIGN PATENT DOCUMENTS

| | | | | |
|---|---|---|---|---|
| WO | 2012152551 A1 | 11/2012 | | |
| WO | WO 2015107870 A1 * | 7/2015 | ........... | H01L 23/053 |

* cited by examiner

*Primary Examiner* — Jose Gonzalez Quinones
(74) *Attorney, Agent, or Firm* — David Kelley; Brooks Kushman P.C.

(57) ABSTRACT

A power supply is provided. The power supply device includes a power module and a capacitor. The power module includes inverting circuitry and is configured to deliver electrical power to an electric machine. The capacitor is disposed adjacent to the power module and is arranged to limit voltage variation at the inverting circuitry input due to ripple current. The inverting circuitry and the capacitor are surrounded by a monolithic non-metal casing that provides voltage isolation between the power module and the capacitor.

16 Claims, 5 Drawing Sheets

POWER SUPPLY DEVICE

TECHNICAL FIELD

The present disclosure relates to electric vehicles and power supply devices for electric vehicles.

BACKGROUND

Electric and hybrid vehicles may include power modules that are configured to convert DC electrical power from a traction battery into AC electrical power in order to supply AC electrical power to a motor that is configured to propel the vehicle.

SUMMARY

A vehicle includes an electric machine, a power module, and capacitor. The power module includes inverting circuitry and is configured to deliver electrical power to the electric machine. The capacitor is arranged to absorb ripple currents generated by the power module. The inverting circuitry and the capacitor are over molded with and encapsulated by a monolithic non-metal insulating material.

A power supply includes a power module and a capacitor. The power module includes inverting circuitry and is configured to deliver electrical power to an electric machine. The capacitor is disposed adjacent to the power module and is arranged to limit voltage variation at the inverting circuitry input due to ripple current. The inverting circuitry and the capacitor are surrounded by a monolithic non-metal casing that provides voltage isolation between the power module and the capacitor.

A power supply includes an inverter, a plurality of capacitor cells coupled to a capacitor bus, a cooling manifold, and a primary bus. The inverter is configured to deliver electrical power to an electric machine. The capacitor cells are arranged to absorb ripple currents generated by the inverter. The cooling manifold is adjacent to the inverter and the capacitor bus. The primary bus couples the capacitor bus to the inverter. The inverter, capacitor cells, and cooling manifold are over molded with and encapsulated by a monolithic insulating epoxy. The monolithic insulating epoxy provides voltage isolation between the inverter and the capacitor.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
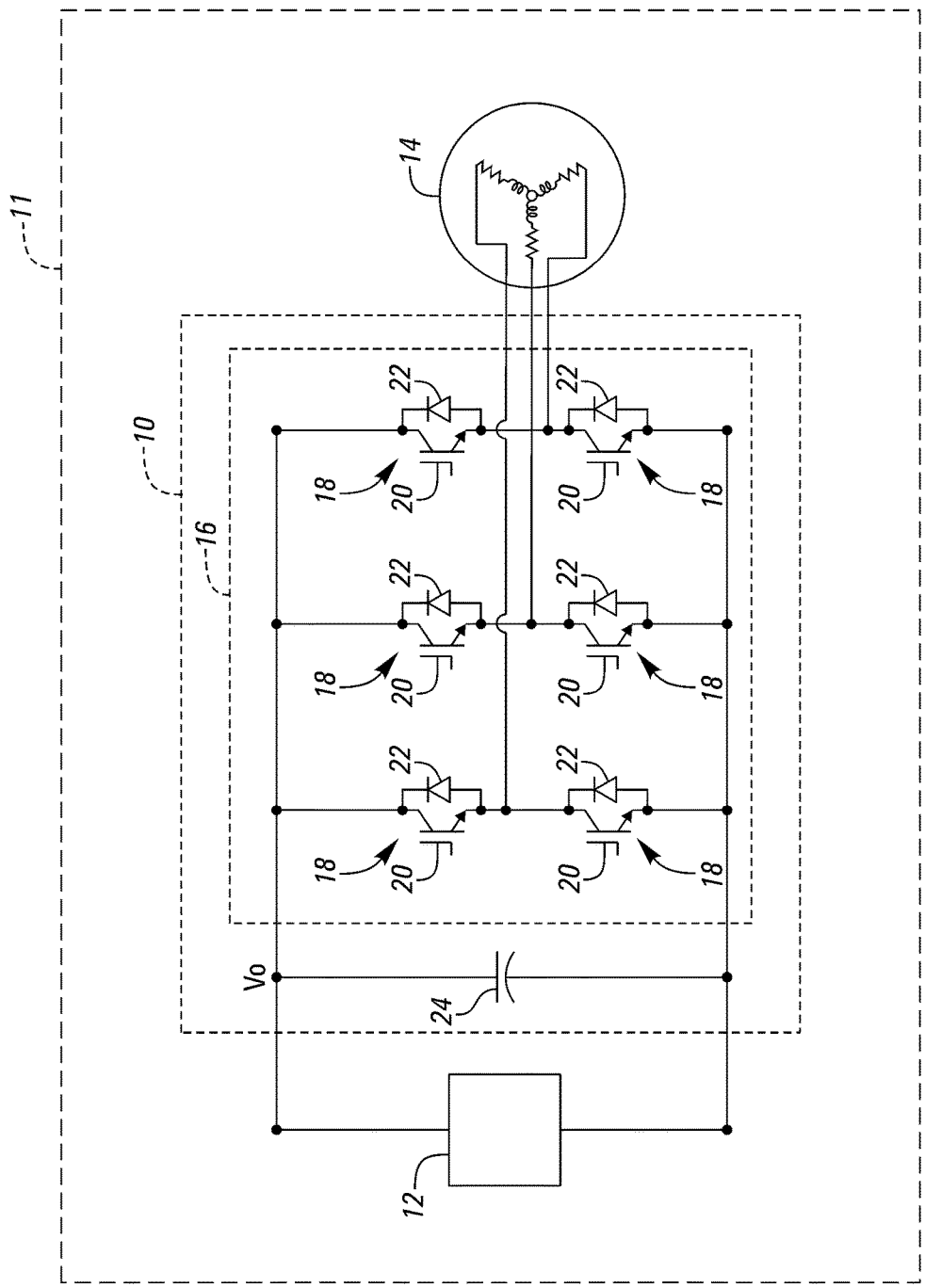
FIG. 1 is a circuit diagram illustrating a power supply device coupled to a power source and a load.

Referring to FIG. 1, a circuit diagram of a power supply device 10 coupled to a power source 12 and a load 14 is illustrated. The power supply device 10 may be utilized in an electric drive system of a vehicle 11, such as an electric or hybrid vehicle. The power source 12 may be coupled to the power supply device 10 in order to drive the load 14. In some contexts, including the context of an electric or hybrid vehicle, the power source 12 may be a battery, such as a traction battery, and the load 14 may be an electric machine such as an electric motor or electric motor/generator. The power source 12 may further comprise a high voltage battery that is coupled to a voltage converter. The power supply device 10 may include a power module 16. The power module 16 may be configured to deliver electrical power to the load 14. Furthermore, the power module 16 may be an inverter.

The power module 16 may include inverting circuitry. The inverting circuitry may include switching units 18. The switching units 18 may each comprise a transistor 20, such as an insulated gate bipolar transistor (IGBT), in antiparallel with a diode 22. The switching units 18 may be configured to provide alternating current to the load 14. The power module 16 may also be configured to convert direct electrical current into alternating electrical current. The power supply device 10 may include a linking capacitor 24. The linking capacitor 24 may be disposed between the power source 12 and the power module 16. The linking capacitor 24 may be configured to absorb ripple currents generated at the power module 16 or the power source 12, and stabilize the DC-link voltage, $V_o$, for power module 16 control. Stated in other terms, the linking capacitor 24 may be arranged to limit voltage variation at an input of inverting circuitry due to ripple currents generated by the inverting circuitry in the power module 16 or a battery, such as a traction battery, that may comprise the power source 12.

The disclosure should not be construed as limited to the circuit diagram in FIG. 1, but should include power supply devices that include other types power modules, inverters, capacitors, or combinations thereof. For example, the power module 16 may be an inverter that includes any number of switching units and not limited to the number of switching units depicted in FIG. 1. Alternatively, the linking capacitor 24 may be configured to couple one or a plurality of inverters to a power source.

Figure 2:
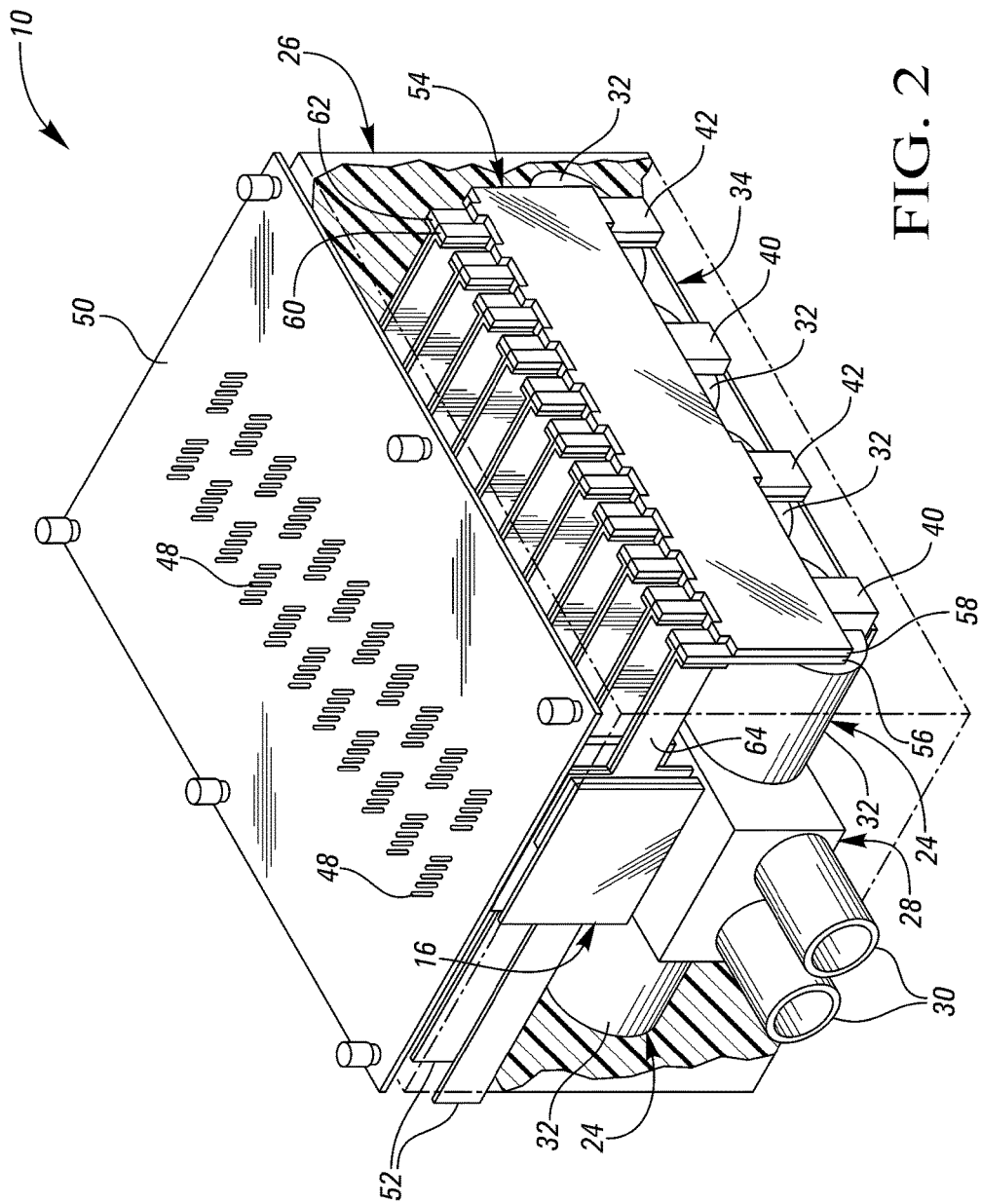
FIG. 2 is an isometric front view of the power supply device.
Figure 3:
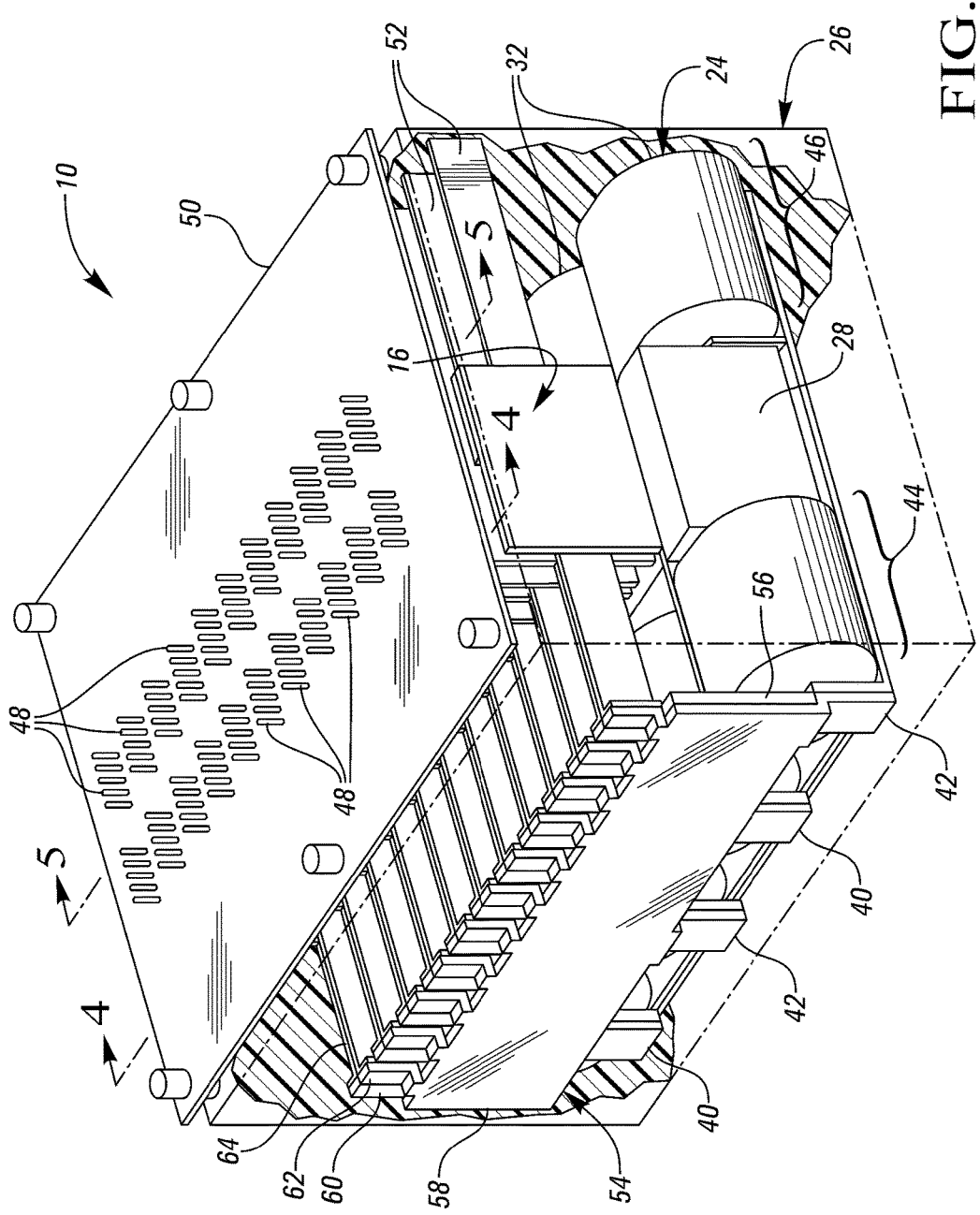
FIG. 3 is an isometric rear view of the power supply device.
Figure 4:
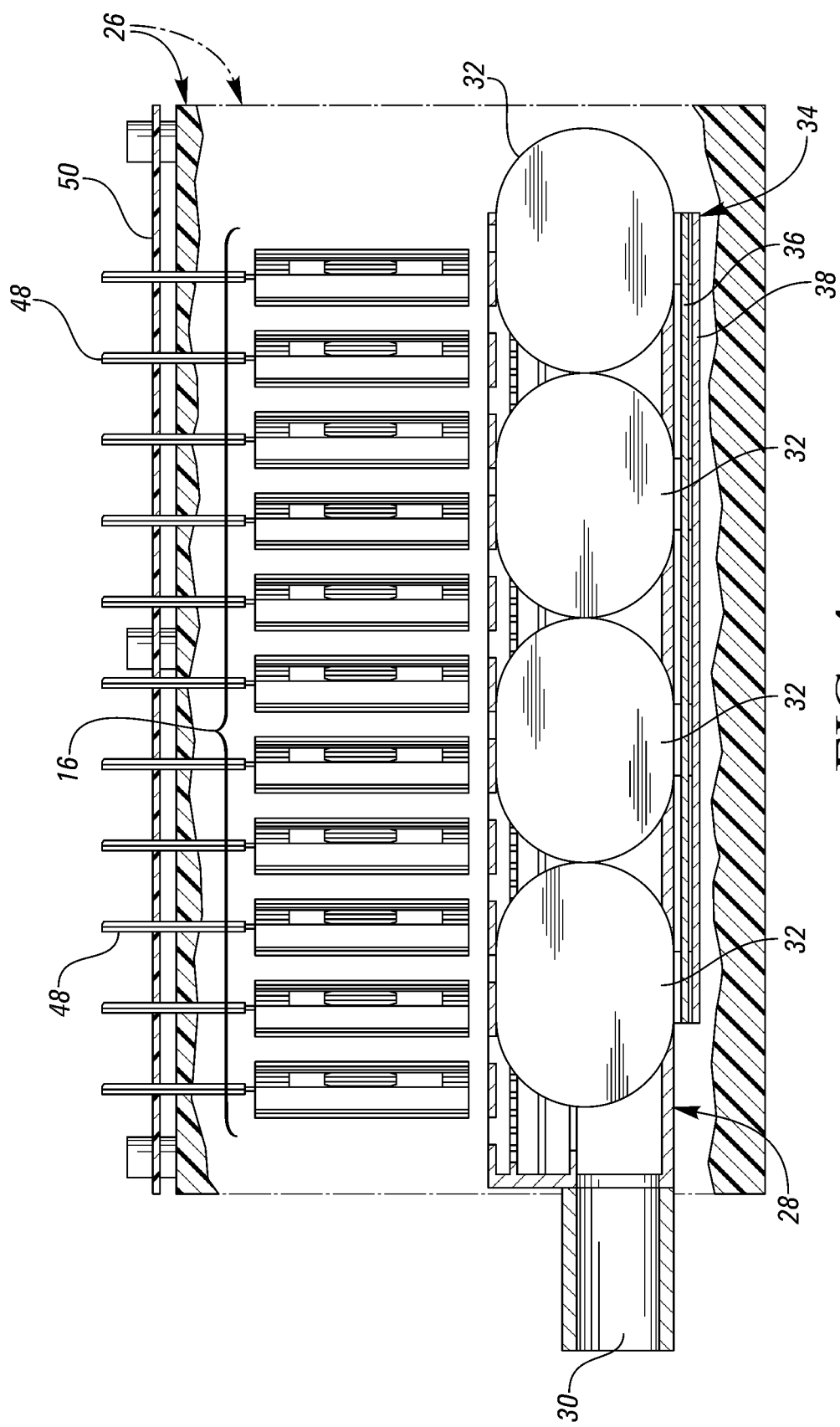
FIG. 4 is a cross-sectional view of the power supply device taken along line 4-4 in FIG. 3.
Figure 5:
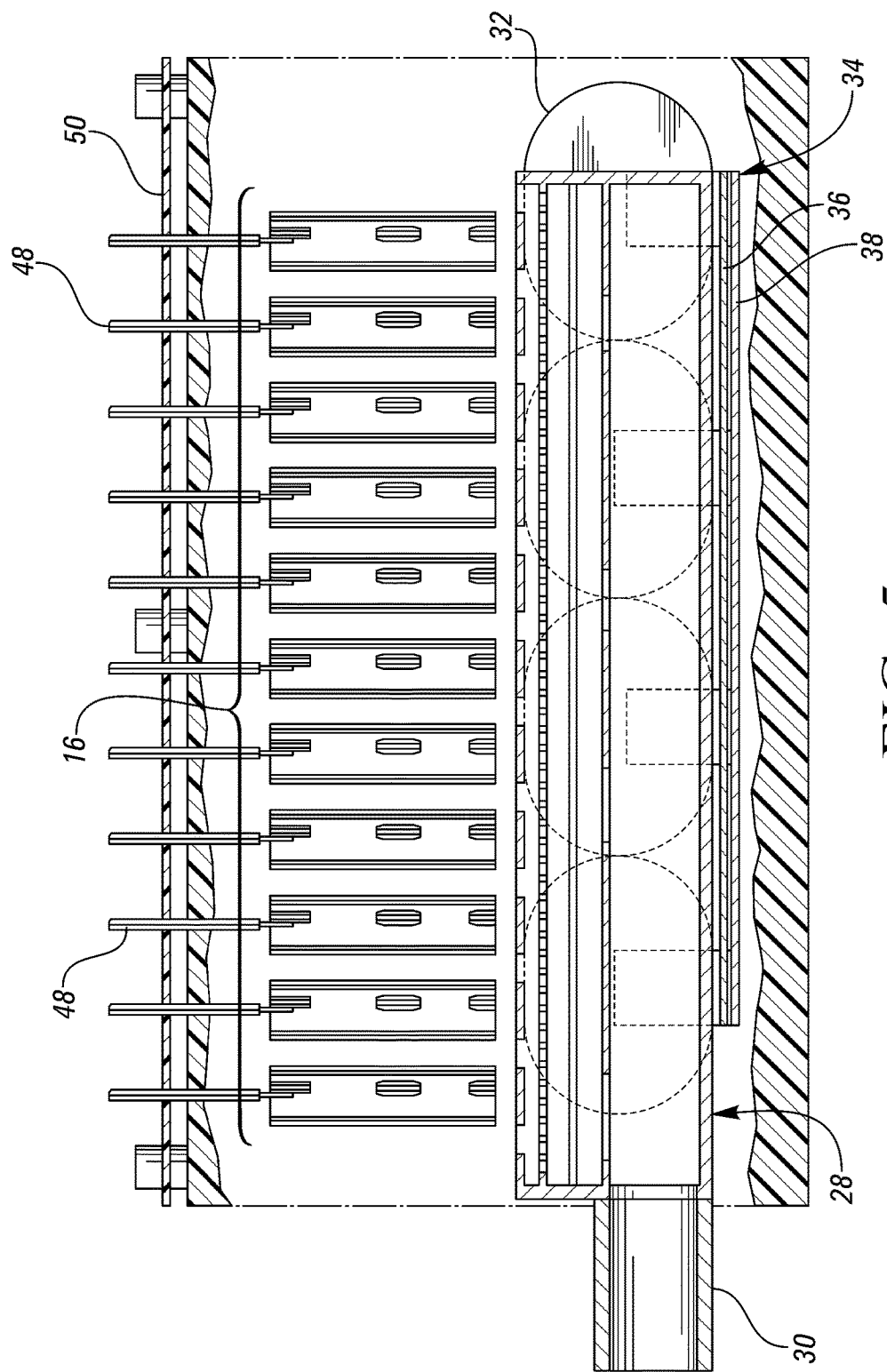
FIG. 5 is a cross-sectional view of the power supply device taken along line 5-5 in FIG. 3.

Referring to FIGS. 2-4, the power supply device 10 is illustrated. The linking capacitor 24 is shown coupled to the power module 16 that is configured to deliver electrical power to the load (electrical machine) 14. The power module 16 and the linking capacitor 24 may be both over molded with and encapsulated by a monolithic non-metal insulating material (or casing) 26 that provides voltage isolation between the power module 16 and linking capacitor 24. More specifically, the inverting circuitry of the power module 16 and the linking capacitor 24 may be both over molded with and encapsulated by the monolithic non-metal insulating material 26 to provide voltage isolation between the power module 16 and linking capacitor 24.

The monolithic non-metal insulating material 26 may comprise an electrically non-conductive epoxy, resin, plastic, or other material that is capable of over molding and encapsulating the power module 16 and linking capacitor 24 into a single package or component, such that voltage isolation is provided between the power module 16 and linking capacitor 24. The monolithic non-metal insulating material may be monolithic in that it is a solid single piece. The monolithic non-metal insulating material may form a solid single piece that both surrounds the power module 16 and linking capacitor 24, and fills any voids that may exist between the power module 16 and linking capacitor 24. The monolithic non-metal insulating material 26 may also provide thermal insulation between the power module 16 and linking capacitor 24.

The power supply device 10 may also include a cooling manifold 28. The cooling manifold 28 may also be over molded with and encapsulated by the monolithic non-metal insulating material 26. The cooling manifold 28 may be over molded with and encapsulated by the monolithic non-metal insulating material 26 such that the cooling manifold 28 is disposed adjacent to the power module 16 and/or the inverting circuitry of the power module 16. The cooling manifold may be configured to remove excess heat from the power module 16 and/or the inverting circuitry of the power module 16. The cooling manifold 28 may include ports 30 that are utilized as inlets and outlets for a cooling fluid that is cycled through the cooling manifold 28. The cooling manifold 28 may also be over molded with and encapsulated by the monolithic non-metal insulating material 26 such that the cooling manifold 28 is disposed adjacent to the linking capacitor 24. The cooling manifold 28 may also be configured to remove excess heat from the linking capacitor 24 in addition to removing heat from the power module 16.

The linking capacitor 24 may include a plurality of capacitor cells 32 that are coupled to a capacitor bus 34. The capacitor bus 34 may include a positive connection 36 and a negative connection 38. The positive connection 36 and negative connection 38 of the capacitor bus 34 may comprise bus bars or plates that include positive terminals 40 and negative terminals 42. The capacitor cells 32 and/or capacitor bus 34 may also be over molded with and encapsulated by the monolithic non-metal insulating material 26.

The cooling manifold 28 may also be over molded with and encapsulated by the monolithic non-metal insulating material 26 such that the cooling manifold 28 is disposed adjacent to the capacitor cells 32 and/or capacitor bus 34. The cooling manifold 28 may also be configured to remove excess heat from the capacitor cells 32 and/or capacitor bus 34.

The plurality of capacitor cells 32 may include a first bank of cells 44 and a second bank of cells 46. The first bank of cells 44 and second bank of cells 46 may also be over molded with and encapsulated by the monolithic non-metal insulating material 26. The cooling manifold 28 may be over molded with and encapsulated by the monolithic non-metal insulating material 26 such that the cooling manifold 28 is disposed adjacent to or between the first bank of cells 44 and second bank of cells 46. The cooling manifold may also be configured to remove excess heat from the first bank of cells 44 and second bank of cells 46.

The power module 16 may include connectors 48 that protrude or extend from the monolithic non-metal insulating material 26. The connectors 48 are configured to couple the power module 16 and the inverting circuitry of the power module 16 to a controller 50. The controller 50 may be a gate drive board that is configured to operate the transistors 20 of the switching units 18 of the power module (or inverter) 16 when delivering electrical power to the load 14, which may include converting direct electrical current into alternating electrical current.

The power module 16 may also include connectors 52 that are configured to couple the power module 16 and the inverting circuitry of the power module 16 to the load 14. The connectors 52 may also protrude from the monolithic non-metal insulating material 26.

The linking capacitor 24 (which may be a plurality of capacitor cells 32) may be coupled to the power module 16 by a primary bus 54. The primary bus 54 may include a positive connection 56 and negative connection 58. The positive connection 56 and negative connection 58 of the primary bus 54 may comprise bus bars or plates that include positive terminals 60 and negative terminals 62.

If the linking capacitor 24 includes a plurality of capacitor cells 32, then the plurality of capacitor cells may be coupled to the primary bus 54 via the capacitor bus 34. Furthermore, the plurality of capacitor cells 32 may be coupled to the primary bus 54 via the positive terminals 40 and negative terminals 42 of the capacitor bus 34. The positive terminals 40 of the capacitor bus 34 may be connected to the positive connection 56 of the primary bus 54. The negative terminals 42 of the capacitor bus 34 may be connected to the negative connection 58 of the primary bus 54.

The power module 16 may include connectors 64 that are configured to connect the power module 16 to the primary bus 54. The connectors 64 may include positive and negative terminals. The positive terminals of the connectors 64 may be connected to the positive connection of the primary bus 54. The negative terminals of the connector 64 may be connected to the negative connection 58 of the primary bus 54. The primary bus 54 may be configured to couple the power module 16 (or inverting circuitry of the power module) and the linking capacitor 24 to the power source 12. The primary bus 54 or a portion of the primary bus 54 may also be over molded with and encapsulated by the monolithic non-metal insulating material 26. Alternatively, the connector 64 of the power module 16 and the linking capacitor 24 (or capacitor bus 34) may be directly coupled to the power source 12.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:
1. A vehicle comprising:
   an electric machine;

a power module, including inverting circuitry, configured to deliver electrical power to the electric machine;

a cooling manifold disposed below the circuitry; and a capacitor, having first and second banks of cells respectively disposed on opposing sides of the manifold below the circuitry, configured to absorb ripple currents in the module, wherein the circuitry, manifold, and capacitor are over molded with and encapsulated by a monolithic non-metal insulating material.

2. The vehicle of claim 1, further comprising a capacitor bus over molded with and encapsulated by the monolithic non-metal material, and configured to couple the inverting circuitry and capacitor.

3. The vehicle of claim 2, wherein the cooling manifold is disposed adjacent to the capacitor bus.

4. The vehicle of claim 1, wherein the power module includes connectors extending from the monolithic non-metal material and configured to couple the inverting circuitry to a gate drive board.

5. The vehicle of claim 1, wherein the power module includes connectors extending from the monolithic non-metal material and configured to couple the inverting circuitry to the electric machine.

6. The vehicle of claim 1, further comprising a primary bus configured to couple the inverting circuitry and capacitor bus to a battery.

7. The vehicle of claim 6, wherein a portion of the primary bus is over molded with and encapsulated by the monolithic non-metal material.

8. A power supply device comprising:

a power module, including inverting circuitry, configured to deliver electrical power to an electric machine;

a cooling manifold disposed below the circuitry; and a capacitor, having first and second banks of cells respectively disposed on opposing sides of the manifold below the circuitry, configured to limit voltage variation at an input of the circuitry due to ripple current, wherein the circuitry, manifold, and capacitor are surrounded by a monolithic non-metal casing that provides voltage isolation between the power module and the capacitor.

9. The power supply device of claim 8 further comprising a capacitor bus being surrounded by the monolithic non-metal casing, and configured to couple the inverting circuitry to the first and second banks of cells.

10. The power supply device of claim 9, wherein the cooling manifold is disposed adjacent to the capacitor bus.

11. The power supply device of claim 9, further comprising a primary bus configured to couple the inverting circuitry and the capacitor bus to a battery.

12. The power supply device of claim 11, wherein a portion of the primary bus is surrounded by the monolithic non-metal casing.

13. The power supply device of claim 8, wherein the power module includes connectors extending from the monolithic non-metal casing and configured to couple the inverting circuitry to a gate drive board.

14. The power supply device of claim 8, wherein the power module includes connectors extending from the monolithic non-metal casing and configured to couple the inverting circuitry to the electric machine.

15. The power supply device of claim 8, wherein the power module is an inverter.

16. A power supply comprising:

an inverter, including circuitry, configured to deliver electrical power to an electric machine;

a plurality of capacitor cells, having first and second banks disposed below the circuitry, coupled to a capacitor bus, and being arranged to absorb ripple currents generated by the inverter;

a cooling manifold disposed below the circuitry and between first and second banks; and a primary bus coupling the capacitor bus to the inverter, wherein the inverter, capacitor cells, and cooling manifold are over molded with and encapsulated by a monolithic insulating epoxy that provides voltage isolation between the inverter and capacitor cells.

\* \* \* \* \*